Patented Jan. 9, 1951

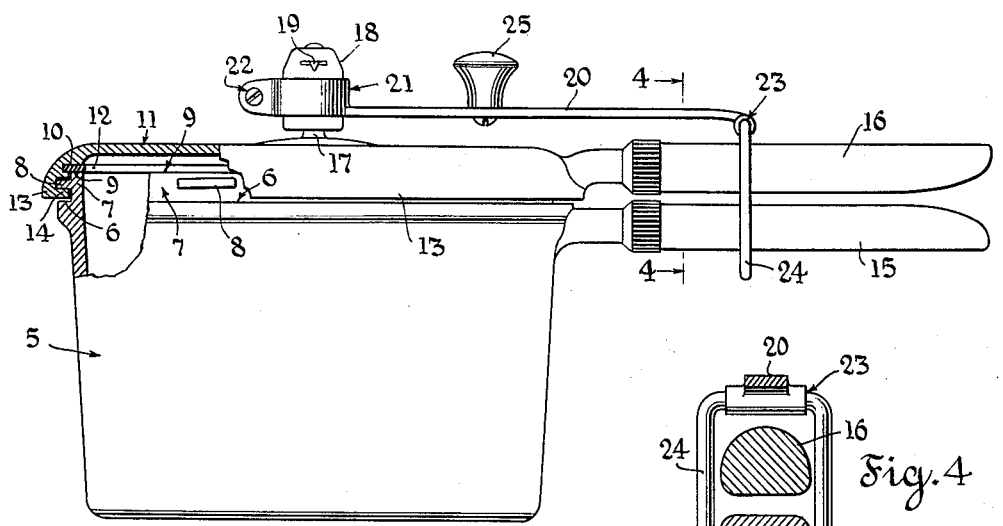
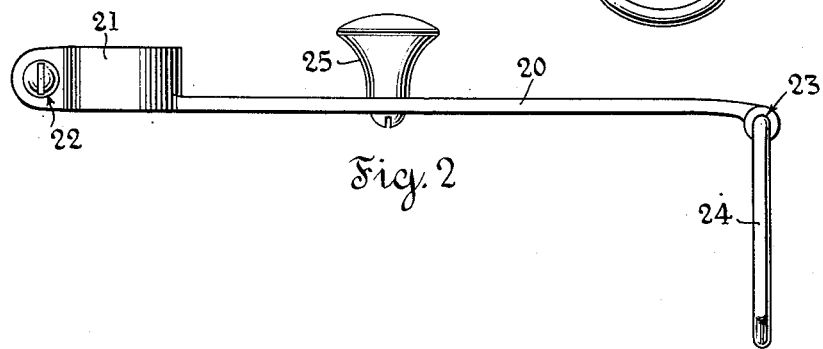
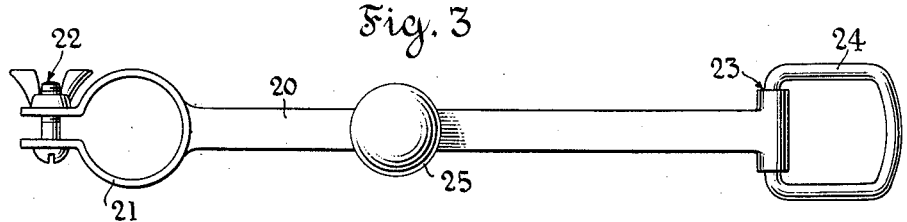

2,537,665

UNITED STATES PATENT OFFICE 2,537,665

SAFETY HANDLE LOCK FOR PRESSURE COOKERS

Myer Goldstein, Mattapan, Mass.

Application April 8, 1947, Serial No. 740,241

9 Claims. (Cl. 220—55)

The invention relates generally to safety devices and primarily seeks to provide a novel handle lock mountable on pressure cookers commonly used in homes in a manner for positively preventing the opening of a cooker without first removing the indicator weight which is removably applied over the vent pipe to retain the proper amount of pressure within the cooker during a cooking operation.

A conventional form of home pressure cooker includes a body having an upstanding neck equipped with locking lugs projecting radially outwardly therefrom at equidistantly spaced intervals. A cover for the body has a rim portion dimensioned to telescope over the body neck and equipped with inwardly projecting cam lugs adapted to be inserted between the neck lugs when the cover and body are brought together and to interlock with said lugs to securely lock the cover and body together as the cover and body are turned relatively, with a deformable sealing band carried by the cover pressed in tight sealing contact with the body neck. In order to facilitate handling of the cooker, and also the relative turning of the body and cover sections, said sections are provided with radially projecting handles so disposed as to extend in close alignment one over the other when the cover section is securely locked on the body section. The cover section is equipped with a vent pipe through which steam may escape from the interior of the cooker, and in order to safely maintain the desired pressure within the cooker, an indicator weight is removably mountable over said vent pipe. The indicator weight includes an indicator member movable between an "off" position indicating a pressure condition within the cooker that will permit safe opening, and a "cook" position indicating that a proper cooking pressure has been reached within the cooker and that the cover cannot be removed with safety. Users of such pressure cookers are warned never to take the cover off without first removing the indicator weight, and never to remove the weight until the indicator member returns to the "off" position following a cooking operation.

It is the purpose of the present invention to provide means, readily mountable upon pressure cookers of the character stated which will make it impossible to move the handles relatively for the purpose of effecting a separation of the body and cover without first removing the indicator weight.

In its more detailed nature the invention resides in providing a safety device of the character stated including an arm having provision for clamping the same to the indicator weight so as to be movable therewith, and a bail loop pivotally connected to the arm and dimensioned to removably receive the aligned cover and body handles, thereby to secure said handles against relative movement and make it impossible to open the cooker without first lifting the indicator weight from the vent pipe and then sliding said loop off the free ends of said handles.

An object of the invention is to provide a safety device of the character stated in which the arm attached to the indicator weight includes a handle portion formed of a material which is a poor conductor of heat, thereby making it possible to grasp said handle portion in effecting the removal of the indicator weight from the cover and the bail loop from the aligned handles, without the necessity of burning the hand by the grasping of any metal part.

With the above and other objects in view that will hereinafter appear, the nature of the invention will be more clearly understood by reference to the following detailed description, the appended claims, and the several views illustrated in the accompanying drawing.

In the drawing:

Figure 1 is a side elevation illustrating a pressure cooker with the invention applied thereon, parts being broken away and in section.

Figure 2 is a side elevation illustrating the safety handle lock per se.

Figure 3 is a plan view of the device shown in Figure 2.

Figure 4 is a detail vertical cross section taken on the line 4—4 on Figure 1.

In the example of embodiment of the invention herein disclosed, there is illustrated a conventional form of pressure cooker including a body 5 having an annular flange 6 at its top, and a neck portion 7 extending above said flange and equipped with a plurality of radially outwardly projecting, circumferentially spaced lugs 8. The neck 7 terminates upwardly in a sealing flange 9 adapted to be opposed by the sealing flange 10 of a cover 11. The cover has a sealing band 12 of deformable material such as rubber or neoprene mounted in a groove formed therein, and depending from the cover flange 10 is a securing flange 13 which is dimensioned to fit over or receive the upstanding neck 7 of the body 5. The securing flange portion 13 of the cover is equipped with a plurality of circumferentially spaced lock cam lugs 14 which are insertable between the body lugs 8 and adapted to be engaged in locking contact under said lugs 8 by relative turning of the cover on the body in the well known manner. It will be apparent that the cooperating body and cover lugs 8 and 14 provide an interrupted-thread-like means adapted to interlock and secure the cover on the body in a quickly releasable manner.

In order to facilitate the handling, assembly and disassembly of the cover and body sections of the cooker said body and cover sections are provided with radially projected handles respectively designated 15 and 16 and which are so disposed as to be closely aligned one over the other when the cover has been applied and turned so as to cause the body and cover lugs 8 and 14 to interlock in the well known manner for causing the sealing band 12 to engage in pressure sealing contact upon the sealing flange 9 of the body neck 7.

A vent pipe 17 is provided on the cover 11, and when the cooker is in use a generally cylindrical indicator weight 18 is removably mounted on the vent pipe 17 in order to retain within the cooker the desired amount of steam pressure. The indicator weight includes an indicator generally designated 19 which functions in the well known manner to indicate when a proper cooking pressure is retained therein, and when said pressure is off and the cover and body sections of the cooker can be separated with safety.

All of the pressure cooker parts hereinabove described are of conventional form, and in themselves, form no part of the present invention. It is the purpose of the present invention to provide a safety device which is readily mountable on a pressure cooker of the type stated and which will serve to make it impossible to move the cover relative to the body so as to effect a separation of the cover and body sections without first removing the indicator weight generally designated 18, thus making it impossible to move the handles 15 and 16 relatively so as to effect a separation of the cover and body sections 5 and 11 before the indicator weight 18 has been removed to release the pressure within the cooker. In this manner, accidents which might result from the opening of the cooker while pressure is retained therein are avoided.

The improved safety device includes an arm 20 which has a contractible band 21 secured to one end thereof. The band 21 is provided with a wing bolt and nut equipment 22 by which the same can be tightly clamped about the indicator weight 18. In this manner, the arm 20 of the safety device can be attached to the indicator weight 18 so as to be movable therewith as the indicator weight is mounted or dismounted.

At its other end, the arm 20 is pivotally connected as at 23 with a loop 24 which may be readily slid on or off the free ends of the handles 15 and 16 when they are brought into the adjacent, aligned relation which they assume when the cover 11 is properly secured upon the body 5.

The arm 20 also includes a handle portion 25 which is formed of a material constituting a poor conductor of heat, and by reason of the provision of the handle portion 25 it is possible to manipulate the safety device without burning the hands by reason of contact with any metal part.

In the practical use of the safety device the loop 24 is slid over the free ends of the aligned handles 15 and 16 so as to place the indicator weight 18 which is attached to the arm 20 directly over the vent pipe 17, and when the indicator weight is properly applied to the vent pipe, the cooker is in condition for carrying out the desired cooking process. The pivotal connection of the arm 20 with the loop facilitates the mounting of the loop on the cooker handles and also the proper application of the indicator weight 18 upon the vent pipe 17.

It will be apparent that so long as the indicator weight is permitted to remain on the vent pipe 17, the loop 24, by reason of its encirclement of the handles 15 and 16 will prevent such relative movement of said handles so as to make it impossible to separate the cover section 11 from the body section. Thus it is impossible to open the cooker until the indicator weight 18 has been removed and the steam pressure is released from the interior of the cooker. The safety device can be readily removed from the cooker by lifting the indicator weight 18 from the vent pipe 17 by manipulation of the handle portion 25, thereby to release the steam pressure from the interior of the cooker, and after sliding the loop 24 off the free ends of the handles 15 and 16, said handles can be moved relatively to effect the desired separation of the cover section 11 from the body section 5 of the cooker.

The handle portion 25 may be formed of any material which is a poor conductor of heat, examples of such materials being wood, Bakelite and other plastics which may readily be molded to the desired shape.

While one form of the invention has been shown for purposes of illustration, it is to be clearly understood that various changes in the details of construction and arrangement of parts may be made without departing from the spirit and scope of the invention as defined in the appended claims.

I claim:

1. A safety device readily mountable as an attachment on pressure cookers which include a body, a cover having a vent, separate handle members projecting from the body and cover, means removably mountable over said vent to retain pressure within the cooker, and means on the body and cover adapted to interlock and secure the cover and body against separation as the handles are moved relatively into a position in which they align one adjacent the other; said device comprising an arm, means adapted for effecting a secure attachment between the arm and said pressure retaining means, and a loop attached to said arm and adapted to be slid over the free ends of the aligned handles incidental to the placement of the pressure retaining means over the cover vent and effective for securing said handles against relative movement whenever the pressure retaining means is in place over the cover vent and removable over the free ends of said handles only with attendant removal of said pressure retaining means from the vent, thereby making it impossible to move the handles relatively to open the cooker without first removing the pressure retaining means from the vent and the handle securing means from the handle.

2. A device as defined in claim 1 in which the loop is pivotally attached to one end of the arm.

3. A device as defined in claim 1 in which the means for effecting the secure attachment between the arm and the pressure retaining means comprises a contractible clamp ring secured to the arm and adapted to be clamped about said pressure retaining means.

4. In a pressure cooker wherein is provided a body, a cover having a vent, separate handle members projecting from the body and cover, means removably mountable over said vent to retain pressure within the cooker, and interrupted-thread-like means on said body and cover adapted to interlock as the cover is turned on the body in a plane perpendicular to the cover axis and secure the cover and body against separation as the handles are moved relatively into a position in which they align one over and adjacent the other; in combination, an attachment comprising an arm, means securing the arm to said pressure retaining means, and a handle embracing member shaped to embrace the handles and secure them against relative movement in a direction for releasing the cover, said arm serving as a distance piece between and connecting the handle embracing member and the pressure retaining means to cause them to be movable together whereby removal of the handle embracing member from the handle securing embracement of the handles can be effected only with an attendant removal of the pressure retaining means from the vent.

5. In a pressure cooker wherein is provided, a body, a cover having a vent, separate handle members projecting from the body and cover, means removably mountable over said vent to retain pressure within the cooker, and interrupted-thread-like means on said body and cover adapted to interlock as the cover is turned on the body in a plane perpendicular to the cover axis and secure the cover and body against separation as the handles are moved relatively into a position in which they align one over and adjacent the other; in combination, an attachment comprising an arm, means securing the arm to said pressure retaining means, and a loop attached to said arm and slidable over the free ends of the aligned handles for securing said handles against relative movement in a direction for releasing the cover, said arm serving as a distance piece between and connecting the loop and the pressure retaining means to cause them to be movable together whereby removal of the loop off the free ends of the aligned handles must necessarily be attended by a removal of the pressure retaining means from the vent.

6. Apparatus as defined in claim 4 in which the arm has mounted thereon a non-metallic handle portion which is a poor conductor of heat and by which the arm, the pressure retaining means and the handle securing means can be manipulated without the necessity of burning the hand by the grasping of any metal part.

7. Apparatus as defined in claim 5 in which the arm has mounted thereon a non-metallic handle portion which is a poor conductor of heat and by which the arm, the pressure retaining means and the loop can be manipulated without the necessity of burning the hand by the grasping of any metal part.

8. Apparatus as defined in claim 5 in which the loop is pivotally connected to the arm and the arm has mounted thereon a non-metallic handle portion which is a poor conductor of heat and by which the arm, the pressure retaining means and the loop can be manipulated without the necessity of burning the hand by the grasping of any metal part.

9. Apparatus as defined in claim 5 in which the pressure retaining means is in the form of a generally cylindrical weighted body placeable over the vent and the arm is provided with a contractible clamp ring secured about said weighted body.

MYER GOLDSTEIN.

REFERENCES CITED

The following references are of record in the file of this patent:

UNITED STATES PATENTS

| Number | Name | Date |
|---|---|---|
| 150,752 | Dunham | May 12, 1874 |
| 2,416,600 | Waddell | Feb. 25, 1947 |
| 2,436,566 | Goldberg | Feb. 24, 1948 |

FOREIGN PATENTS

| Number | Country | Date |
|---|---|---|
| 206,357 | Great Britain | Nov. 8, 1923 |